(12) United States Patent
Radulescu et al.

(10) Patent No.: US 7,613,849 B2
(45) Date of Patent: Nov. 3, 2009

(54) INTEGRATED CIRCUIT AND METHOD FOR TRANSACTION ABORTION

(75) Inventors: Andrei Radulescu, Eindhoven (NL); Kees Gerard Willem Goossens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 445 days.

(21) Appl. No.: 10/599,215

(22) PCT Filed: Mar. 15, 2005

(86) PCT No.: PCT/IB2005/050909
§ 371 (c)(1),
(2), (4) Date: Sep. 22, 2006

(87) PCT Pub. No.: WO2005/093591
PCT Pub. Date: Oct. 6, 2005

(65) Prior Publication Data
US 2008/0244136 A1    Oct. 2, 2008

(30) Foreign Application Priority Data
Mar. 26, 2004    (EP) .................. 04101263

(51) Int. Cl.
*G06F 13/00* (2006.01)
(52) U.S. Cl. .......................... 710/32; 710/52; 710/110
(58) Field of Classification Search .................. 710/28, 710/32–35, 39, 52, 110
See application file for complete search history.

(56) References Cited

U.S. PATENT DOCUMENTS

| 4,885,739 | A | * | 12/1989 | Read et al. | 370/384 |
|---|---|---|---|---|---|
| 5,276,818 | A | * | 1/1994 | Okazawa et al. | 710/114 |
| 6,032,178 | A | * | 2/2000 | Bacigalupo et al. | 709/208 |
| 6,434,654 | B1 | * | 8/2002 | Story et al. | 710/307 |
| 2003/0110339 | A1 | * | 6/2003 | Calvignac et al. | 710/305 |
| 2007/0234006 | A1 | * | 10/2007 | Radulescu et al. | 712/28 |
| 2007/0268925 | A1 | * | 11/2007 | Sobelman et al. | 370/412 |

OTHER PUBLICATIONS

Xu, Jun: "Asynchronous Interconnection and Interfacing of Intellectual Property Cores in the Design of Systems-On-Chip"; Chapters 5 & 6; 'Online!'; Jul. 1, 2002; Centre for Concurrent Systems and VLSI, School of Computing Information Systems and Mathematics, South Bank University; XP002333385.

Radulescu A. et al: "An Efficient On-Chip Network Interface Offering Guaranteed Services, Shared-Memory Abstraction, and Flexible Network Configuration"; Proceedings of the Design, Automation and Test in Europe Conference and Exhibition, 2004; Proceedings Feb. 16-20, 2004, Piscataway, NJ, USA, IEEE Feb. 16, 2004, pp. 878-883; XP010684780.

* cited by examiner

Primary Examiner—Khanh Dang

(57) ABSTRACT

An integrated circuit includes processing modules and an interconnect device for coupling the processing modules and for enabling a device-level communication based on transactions between the processing modules. A first processing module issues a transaction towards a second processing module. The integrated circuit further includes a transaction abortion unit for aborting the transaction issued from the first module by receiving an abort request issued by the first module, by initiating a discard of the transaction to be aborted, and by issuing a response indicating the success/failure of the requested transaction abortion.

8 Claims, 2 Drawing Sheets

INTEGRATED CIRCUIT AND METHOD FOR TRANSACTION ABORTION

FIELD OF THE INVENTION

The invention relates to an integrated circuit having a plurality of processing modules and an interconnect means for coupling said plurality of processing, a method for transaction abortion in such an integrated circuit as well as a data processing system.

BACKGROUND OF THE INVENTION

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the systems modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus.

A communication network forms an effective way to overcome these disadvantages. Networks on chip (NoC) have received considerable attention recently as a solution to the interconnect problem in highly-complex chips. The reason is twofold. First, NoCs help resolve the electrical problems in new deep-submicron technologies, as they structure and manage global wires. At the same time they share wires, lowering their number and increasing their utilization. NoCs can also be energy efficient and reliable and are scalable compared to buses. Second, NoCs also decouple computation from communication, which is essential in managing the design of billion-transistor chips. NoCs achieve this decoupling because they are traditionally designed using protocol stacks, which provide well-defined interfaces separating communication service usage from service implementation.

Using networks for on-chip communication when designing systems on chip (SoC), however, raises a number of new issues that must be taken into account. This is because, in contrast to existing on-chip interconnects (e.g., buses, switches, or point-to-point wires), where the communicating modules are directly connected, in a NoC the modules communicate remotely via network nodes. As a result, interconnect arbitration changes from centralized to distributed, and issues like out-of order transactions, higher latencies, and end-to-end flow control must be handled either by the intellectual property block (IP) or by the network.

Most of these topics have been already the subject of research in the field of local and wide area networks (computer networks) and as an interconnect for parallel machine interconnect networks. Both are very much related to on-chip networks, and many of the results in those fields are also applicable on chip. However, NoC's premises are different from off-chip networks, and, therefore, most of the network design choices must be reevaluated. On-chip networks have different properties (e.g., tighter link synchronization) and constraints (e.g., higher memory cost) leading to different design choices, which ultimately affect the network services.

NoCs differ from off-chip networks mainly in their constraints and synchronization. Typically, resource constraints are tighter on chip than off chip. Storage (i.e., memory) and computation resources are relatively more expensive, whereas the number of point-to-point links is larger on chip than off chip. Storage is expensive, because general-purpose on-chip memory, such as RAMs, occupy a large area. Having the memory distributed in the network components in relatively small sizes is even worse, as the overhead area in the memory then becomes dominant.

For on-chip networks computation too comes at a relatively high cost compared to off-chip networks. An off-chip network interface usually contains a dedicated processor to implement the protocol stack up to network layer or even higher, to relieve the host processor from the communication processing. Including a dedicated processor in a network interface is not feasible on chip, as the size of the network interface will become comparable to or larger than the IP to be connected to the network. Moreover, running the protocol stack on the IP itself may also be not feasible, because often these IPs have one dedicated function only, and do not have the capabilities to run a network protocol stack.

The number of wires and pins to connect network components is an order of magnitude larger on chip than off chip. If they are not used massively for other purposes than NoC communication, they allow wide point-to-point interconnects (e.g., 300-bit links). This is not possible off-chip, where links are relatively narrower: 8-16 bits.

Introducing networks as on-chip interconnects radically changes the communication when compared to direct interconnects, such as buses or switches. This is because of the multi-hop nature of a network, where communication modules are not directly connected, but separated by one or more network nodes. This is in contrast with the prevalent existing interconnects (i.e., buses) where modules are directly connected. The implications of this change reside in the arbitration (which must change from centralized to distributed), and in the communication properties (e.g., ordering, or flow control).

Modern on-chip communication protocols (e.g., Device Transaction Level DTL, Open Core Protocol OCP, and AXI-Protocol) operate on a split and pipelined basis with transactions consisting of a request and a response and the bus is released for use by others after a request issued by a master is accepted by a corresponding slave. Examples of transactions may include e.g., write+write data as a request, and read as request+read data as response. Split pipelined communication protocols are used especially in multi-hop interconnects (e.g., networks on chip, or buses with bridges), allowing an efficient utilization of the interconnect. The efficiently of a split bus can be increased for cases where a response generation at the slave takes is time consuming. On a pipelined protocol, a master is allowed to have multiple outstanding requests (i.e., requests for which the response is pending or expected).

The above mentioned protocols are designed to operate at a device level, as opposed to a system or interconnect level. In other words they are designed to be independent of the actual interconnect implementation (e.g., arbitration signals are not visible) allowing the reuse of intellectual property blocks IP and their earlier integration. In addition, these communication protocols are designed to ensure that an IP block can communicate "naturally" (e.g., word width and burst sizes are configurable to suit the device rather than a bus).

Some of these protocols (e.g., DTL) include the option to abort transactions that has already been accepted by the target. In the most general sense, a transaction that has been aborted is not executed anymore and it has no effects on the target. In DTL, the semantics is that any outstanding transaction can be attempted to be aborted.

However, aborting transaction in a device-level split pipelined protocol is difficult, because the transaction may pass several intermediate modules (e.g., bridges, adapters) until it reaches its final destination. Accordingly, it may not be possible to stop the transaction. This is especially acute in multi-hop interconnects such as networks on chip and busses with bridges.

Known abort techniques can have ambiguous semantics, or may leave targets in one of more possible states (e.g., the result of trying to abort a write may succeed or not, and as a result the location addressed by the write may contain the old value or the value carried by the write).

It is therefore an object in the invention to provide an improved transaction abortion in a transaction based communication environment.

Therefore, an integrated circuit having a plurality of processing modules and an interconnect for coupling said plurality of processing modules and for enabling a device-level communication based on transactions between said plurality of processing modules is provided. At least one first processing module issues at least one transaction towards at least one second processing module. Said integrated circuit comprise at least one transaction abortion unit for aborting said at least one transaction issued from said first module by receiving an abort request issued by said first module, by initiating a discard of said at least one transaction to be aborted, and by issuing a response indicating the success/failure of the requested transaction abortion.

Aborting transactions is a desirable property for a communication protocol, as it will allow the offload of the interconnect and the slave when a transaction is no longer needed (e.g., data to be sent is too late to be processed, or read data is not useful anymore because some deadline has passed). The advantage of the abort transaction is that it allows the master to get insight of the state of the system after an abort operation. This could allow a more extensive use of the abort transaction with the result of a more efficient use of the interconnect and of the slaves. Here, the transaction abortion unit may be implemented in the interconnect means, the slave or in the master module.

According to an aspect of the invention said integrated circuit comprises at least one network interface associated to one of said plurality of processing modules for controlling the communication between said one of said plurality of processing modules and said interconnect. Said at least one transaction abortion unit is arranged in one of said network interfaces. By associating the transaction abortion unit to the network interface, i.e. close to the module issuing the abort, the modules can continue with their dedicated operations without having to deal with the actual abort communication.

According to a further aspect of the invention said at least one transaction abortion unit is adapted to perform the at least one transaction abortion atomically, i.e. either the complete set of transactions is aborted or none of them, or partially, i.e. as many transactions as possible are aborted, however there may be transactions that are not aborted.

According to a further aspect of the invention said at least one network interface comprises a request buffer for buffering received data and/or a response buffer for buffering outgoing data, and issues a discard for said at least one transaction to be aborted as stored in said request buffer or in said response buffer. Discarding the data in the request/response buffer is an effective way to disclose of the request/response to be aborted.

According to a preferred aspect of the invention said request for said transaction abortion specifies which transactions are to be aborted, and said response issued by said transaction abortion unit specifies which of the requested at least one transaction have been aborted. With such a specific response the master will exactly know the states of all slaves with which it communicates.

The invention is also related to a method for transaction abortion in an integrated circuit having a plurality of processing modules and an interconnect means for coupling said plurality of processing modules and for enabling a device-level communication based on transactions between said plurality of processing modules. At least one first processing module issues at least one transaction towards at least one second processing module. Said at least one transaction issued from said first module is aborted by receiving an abort request issued by said first module, by initiating a discard of said at least one transaction to be aborted, and by issuing a response indicating the success of the requested transaction abortion.

The invention further relates to a data processing system having a plurality of processing modules and an interconnect for coupling said plurality of processing modules and for enabling a device-level communication based on transactions between said plurality of processing modules is provided. At least one first processing module issues at least one transaction towards at least one second processing module. Said integrated circuit comprises at least one transaction abortion unit for aborting at least one transaction issued from said first module by receiving an abort request issued by said first module, by initiating a discard of said at least one transaction to be aborted, and by issuing a response indicating the success/failure of the requested transaction abortion.

Therefore, the transaction abort may also be implemented in a system comprising several separate integrated circuits or multi-chip networks.

The invention is based on the idea to introduce a special abort transaction for attempting to abort transactions. As the abort may succeed or not, a response is required to describe the success/failure of the abort transaction. When a response on the result of the abort is issued, the master issuing the abort transaction will know precisely the resulting state of the slave or the slave environment. A transaction is either aborted completely or not at all, such that slaves do not end up in an intermediate state, or with a partial result.

Further aspects of the invention are described in the dependent claims.

These and other aspects of the invention are apparent from and will be elucidated with reference to the embodiment(s) described hereinafter.

DESCRIPTION OF THE PREFERRED EMBODIMENTS

The following embodiments relate to systems on chip, i.e. a plurality of modules on the same chip (including e.g. system in a package, multi-die modules) or on different chips, communicate with each other via some kind of interconnect. The interconnect is embodied as a network on chip NOC. The network on chip may include wires, bus, time-division multiplexing, switches, and/or routers within a network. At the transport layer of said network, the communication between the modules can be performed over connections. A connection is considered as a set of channels, each having a set of connection properties, between a first module and at least one second module. For a connection between a first module and a single second module, the connection comprises at least one channel, namely one from the first module to the second channel, i.e. the request channel, and a second from the second to the first module, i.e. the response channel. The request channel is reserved for data and messages from the first to the second, while the response channel is reserved for data and messages from the second to the first module. However, if the connection involves one first and N second modules, 2*N channels are provided. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, priority, or data delivery.

Figure 1:
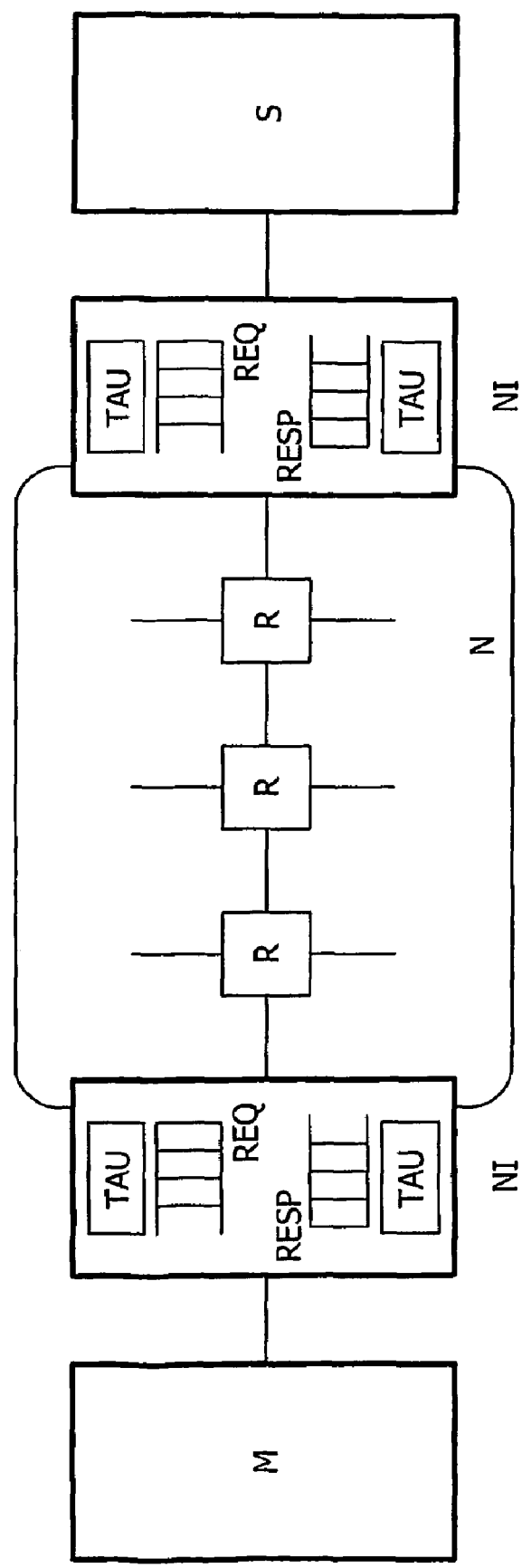
FIG. 1 shows a basic block diagram of a network on chip according to the invention.

FIG. 1 shows a network on chip according to a first embodiment. In particular, a master module M and a slave module S each with an associated network interface NI are depicted. Each module M, S is connected to a network N via its associated network interface NI, respectively. The network interfaces NI are used as interfaces between the master and slave modules M, S and the network N. The network may be comprised of a plurality of interconnected network routers R. The network interfaces NI are provided to manage the communication between the respective modules M, S and the network N, so that the modules can perform their dedicated operation without having to deal with the communication with the network or other modules. A master module M issues a transaction, i.e. a request is issued to the slave module S. This request may comprise a command as well as some data. The slave receives the request and performs the respective processings based on the received command and optionally returns a response possibly also with some data.

The network N may be comprised of a plurality of interconnected network routers R. The routers R can be randomly connected amongst themselves (multiple links between routers are also possible) and to the network interfaces (i.e., there are no topology constraints). The routers R transport packets of data from one network interface NI to another.

The modules as described in the following can be so-called intellectual property blocks IPs (computation elements, memories or a subsystem which may internally contain interconnect modules) that interact with a network at said network interfaces NI. A network interface NI can be connected to one or more IP blocks. Similarly, an IP can be connected to more than one network interfaces.

The network interfaces NI associated to the master M and the slave S each comprise a request buffer REQ and a response buffer RESP as well as a transaction abortion unit TAU associated to each buffer REQ, RESP. Preferably, the transaction abortion unit TAU is incorporated in the network interface NI associated to the master M and the network interface NI associated to the slave S and on the request part and/or the response part of these network interfaces NI. Alternatively, the transaction abortion unit TAU may also be implemented in the slave S when the slave S comprises a queue to buffer requests, i.e. a request buffer. The implementation of the transaction abortion unit TAU in the slave S may be optionally included, since the request might be caught and deleted before it is executed at the slave S.

The master M issues the abort request message, which is processed in the master NI (to delete the requests buffered in the master NI), and optionally sent further in the network to be processed by slave network interface (possibly also by some routers in between), and by the slave itself. A transaction may either be aborted completely or not at all, such that slaves do not end up in an intermediate state, or with a partial result. Alternatively, transactions may be partially discarded (e.g., a long write burst can be stopped when executed partially by the slave), if this is acceptable in the system.

The abort transaction may be performed on all pending transactions, on the last issued transaction, on the last N issued transactions, on a transaction specifically identified or on a set of specifically identified transactions.

All the transactions for which a request has been issued, but no response has been received by the master from a slave S yet, can be subject to the abort. The possible responses can be elaborated further to return whose transactions which have been completely or partially aborted, and in the case of a partial abort, how many have been actually aborted.

Alternatively, the last issued transaction or the last N issued transactions are aborted. Here, a response will be issued to the abort transaction indicating the success or failure of the abort.

Moreover, a third possibility for a transaction abortion is to abort a transaction or a set of transactions identified by a transaction identifier or a set of transaction identifiers. This is applicable when transactions have transactions identifiers (this is not generally the case for on-chip protocols, e.g., OCP, AXI, or DTL do not carry transaction identifiers, but MTL does). Alternatively, a relative identifier can be used (e.g., abort the last second transaction or the $7^{th}$ to $9^{th}$ last transactions), which requires no transaction identifier. Here, a response will be issued to the abort request indicating the success or failure of the abort transaction.

When multiple transactions are to be aborted (e.g., all transactions, or a specified set of transactions), there are two options regarding the abort, namely an atomic abort, i.e. either the complete set of transactions is aborted or none of them, or a partial abort, i.e. as many transactions as possible are aborted, however there may be transactions that are not aborted.

When transactions are not intrusive (i.e., do not change the state of the slave; e.g., read), they can also be aborted on their way back i.e., the response is discarded. This is also possible for intrusive transactions if the system can cope with this.

The network interface, the network, some routers, the master or the slave may issue a response to the above described abort transaction request with various degrees of detail: (a) a success/failure response (i.e. an abort has succeeded or not succeeded for all transactions), (b) a response with a number of transactions with a successful abort, or (c) a response with a list of those transactions for which the abort has succeeded or failed. In the last case, the master M will precisely know the state of the slaves S. Following a request to abort a transaction, it is the network issuing the response, and not the slave. The slave would respond to an abort transaction only if the abort transaction has been supplied to that slave.

A backward compatibility is achieved for a slave that does not implement the abort transaction, as it will always execute the transaction(s) that are subject to abort. The response on the abort transaction will signal an abort failure. When a master does not implement the abort transaction, the responses to the abort from the slave are just ignored.

Figure 2:
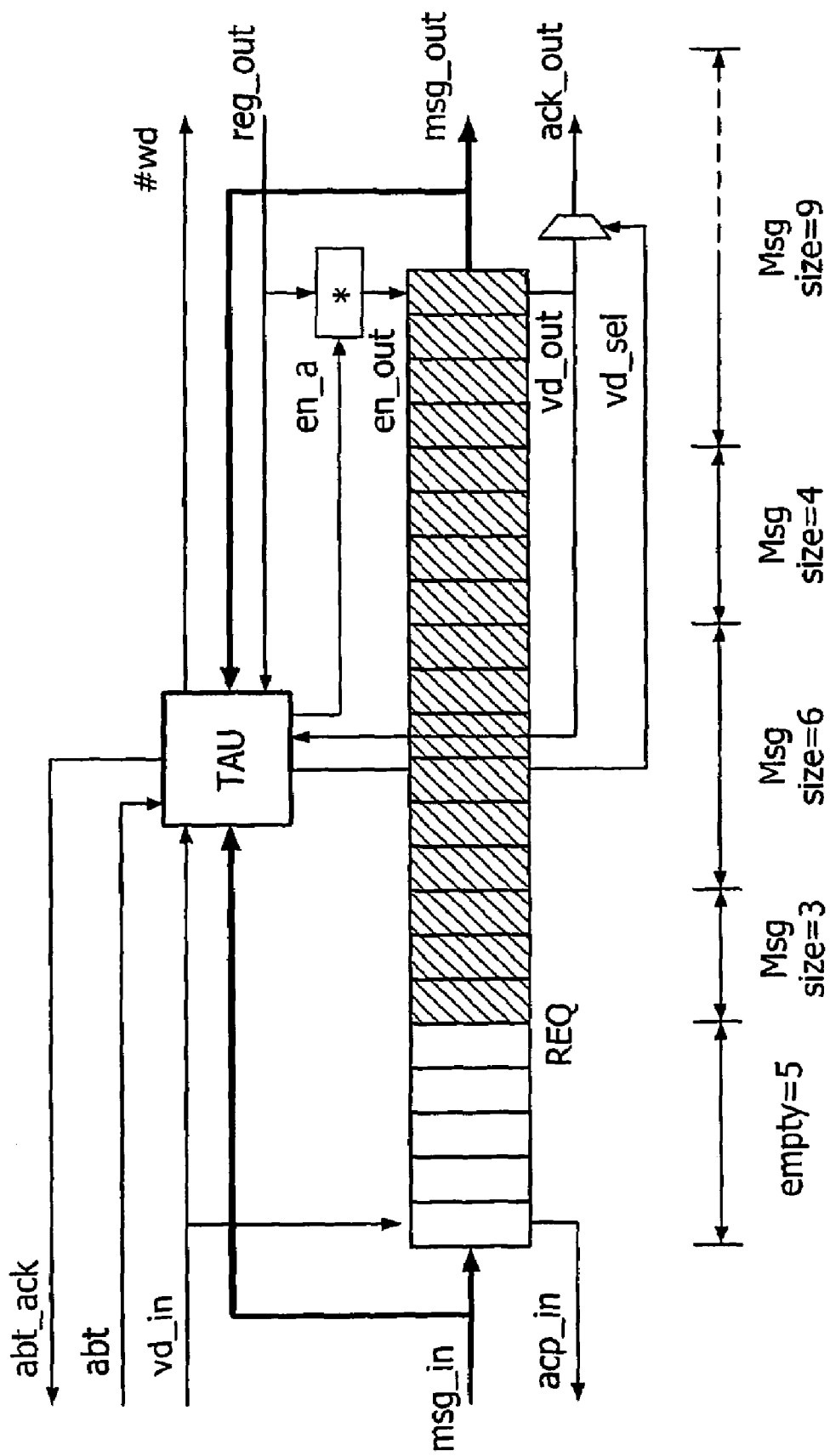
FIG. 2 shows a basic representation of a block diagram of part of the network interface of FIG. 1.

FIG. 2 shows a possible implementation of a part of a network interface with an transaction abortion unit TAU and a hardware FIFO (First In, First Out) for messages. In particular, the request part of the network interface NI is shown comprising a request buffer REQ and a transaction abortion unit TAU. The request buffer REQ receives incoming messages msg_in as input and outputs outgoing messages msg_out. The transaction abortion unit TAU receives the abort request abt, the valid input signal vd_in, the valid output signal vd_out, and a request signal req_out. The transaction abortion unit TAU outputs a number of words #wd, a valid selection vd_sel signal, and response abt_ack.

In a normal flow, messages are queued in the request buffer REQ, i.e. the FIFO, through msg_in. A classic two way handshake (enable-in, i.e. en_in/accept_in, i.e. acp_in for writing into the FIFO and enable-out, i.e. en_out/valid-out, i.e. vd_out for reading from the FIFO) are implemented to transfer message words. When a valid word is present, the signal vd_in is raised, which is signaled as clocked in by rising the signal acp_in for a cycle. The accept signal acp_in can be set high by default such that the FIFO can accept a word at any time in a single cycle. Consequently, words are effectively transferred when the valid signal vd_in and the accept signal acp_in are both high for a clock cycle. In a similar way, messages are moved out of the FIFO, when the enable signal en_out and the valid signal vd_out are both high for a cycle.

Now the abort process for aborting transactions is described in more detail. The transaction abortion unit TAU is triggered by an abort signal abt, which is issued by the master module M. The transaction abortion unit TAU performs the requested abort operations and returns a response to the master indicating the success/failure thereof through the response signal abt_ack. The transaction abortion unit TAU also monitors the requested reading access req_out to the FIFO and inspects the message headers of incoming messages containing the message sizes in order to keep track of all messages stored in the FIFO queue.

Now the transaction abortion for all transactions is described in more detail. When an abort is called, the transaction abortion unit TAU takes a snapshot the content of the FIFO. Therefore, it comprises a delete counter for storing the sum of the lengths of the messages in the FIFO. The stored value indicates the number of words which are to be discarded after the ongoing message has been sent, as they are associated to the transactions to be aborted.

The abort unit TAU outputs a signal #wd indicating the number of non-empty words in the FIFO REQ. When an abort request is received from the master, the signal sets #wd to indicate only the remaining of the ongoing message msg_out. The transaction abortion unit TAU waits until the ongoing message is completely sent, i.e. #wd is zero, and the transaction abortion unit TAU invalidates the message output msg_out by lowering the signal vd_out, and thereby removes the delete words from the FIFO (via enable-out en_out, while invalidating message out msg_out and valid-out vd_out).

The number of deleted messages can be returned to the master module M via the response abt_ack. If transactions are discarded partially as mentioned above the possible responses can be elaborated further to return which transactions have been completely or partially aborted, and in the case of a partial abort, how many have been actually aborted.

New messages can be accepted while executing an abort operation, because message acceptance does not influence the delete counter. Therefore, if a new abort request abt is received while performing an abort, the delete counter is incremented with the sum of the lengths of the new messages added to the FIFO queue. In other words, when new messages are offered while aborting, several options are possible, out of which one is returned as response. Either no message are accepted until abort is finished, or messages are accepted during abort. When messages are accepted two cases are possible depending on the abort semantics, namely messages accepted during abort are also subject to abort and are deleted, or messages accepted during abort are not subject to abort and are not deleted.

Now the transaction abortion for aborting the last issued transaction or the last N issued transactions is described. The functionality is similar to the above described abort for all transactions. Here, all the messages in front of the last message or the last N messages are allowed to be sent out through msg_out. After this, the message associated to the transaction to be aborted is deleted from the FIFO (by invalidating the output while outputting the message out of the FIFO), and the response abt_ack is generated. To effectively delete only the required messages, the message boundaries are identified by the transaction abortion unit TAU by inspecting the message headers of the incoming messages. If transactions are discarded partially the responses can return which transactions have been completely or partially aborted, and in the case of a partial abort, how many have been actually aborted.

The abort for a specific transaction or a set of specific transactions are performed by taking a snapshot of the FIFO, and storing the number of words used in the FIFO in a counter. With every word output from the FIFO, the counter is decremented. If the header of a message with an specific identifier TID arrives at the head of the FIFO, while the counter is not zero, that message is deleted by invalidating the output of the FIFO, and a success or failure is returned by a response abt_ack. If transactions are discarded partially the responses can return which transactions have been completely or partially aborted, and in the case of a partial abort, how many have been actually aborted.

As soon as an abort request from a master is received, only complete messages may be removed from the FIFO, because it is illegal to remove parts of a message, if this leaves the system in an undefined state. For this reason, the transaction abortion unit TAU monitors the message boundaries of incoming messages by inspecting the message headers containing a field with the message length.

In the transaction abortion unit TAU, there may be three counters implemented for keeping track of the message boundaries, namely an incoming counter CntIn, a FIFO counter CntFifo, and outgoing counter CntOut. The incoming counter CntIn stores the number of words that are still to be received of the currently incoming message. The counter CntFifo stores the number of words of the messages present in the FIFO, including the currently incoming and outgoing messages (this counter may already be present as part of the FIFO implementation, as it stores the number of words present in the FIFO). The outgoing counter CntOut stores the number of words that are still to be sent out from the currently outgoing message.

When an abort request arrives, i.e. the abort signal abt is high for at least one clock cycle, a deletion of the messages in the FIFO including the incoming message but excluding the outgoing message will be initiated. This means that CntIn+CntFifo−CntOut words will be discarded. A possible implementation of this is to store the number of words to be discarded in another counter CntDiscard in the transaction abortion unit TAU, and raise the enable signal en_a which releases an output of the FIFO and causes the FIFO to remove words from it. As messages are discarded, the signal vd_out is gated by the signal vd_sel (i.e., not forwarded to the signal ack_out). Words are removed when the signal en_a (and implicitly also en_out) and vd_out are both high. As words are removed, the counter CntDiscard is decremented. When it reaches zero, the abort operation is finished and the normal operation is resumed.

If abort is forwarded as a message to a next module, the transaction abortion unit TAU can create an abort message, which also includes the number of messages which have already been deleted. The abort signal is extracted from such a message. Another possible implementation is to store the number of discarded transactions, forward an abort message, collect its response including the number of further discarded transactions, and add this number to the locally stored number of discarded transactions, which sum is in turns returned to the master.

The slave or the network interface thereof responds to an abort request with a response message as described for the transaction abortion unit of FIG. 2, which is then simply forwarded via the interconnect to the master.

It should be noted, that it is preferable to abort all requests, only if the requests have not been already sent (even not partially sent). If requests have already been (partially) sent, it might be too late to discard them. Even when only part of a request has been sent, the rest cannot be discarded, if it leaves the interconnect and the slave in an undefined state. However, if it is not problematic for the system to be in an undefined state, the already partially sent requests may be discarded according to the counter CntDiscard:=CntIn+CntFifo. In such a case the counter CntOut is not required.

While above the implementation of the transaction abortion unit TAU has been described for the request part of a network interface, the transaction abortion unit TAU may be implemented correspondingly in the response part of the network interface.

The above described transaction abortion units can in principle be implemented anywhere in the network N (in any NI and R) or in the slave S, and not only in one network interface NI.

Accordingly, the invention proposes to introduce a special abort transaction for attempting to abort transactions. The reasons are twofold. Firstly, as it is the question whether the abort succeeds, a response is required to report the success or failure of the abort transaction. Second, having a response on the result of the abort lets the master issuing the abort transaction to know precisely the resulting state of the system. The semantics of an abort operation can be one of the following:
  attempt to abort all pending transactions.
  attempt to abort the N last issued transaction.
  attempt to abort at least one transaction identified by at least one transaction identifier.

The above described transaction abortion can be applied to any multi-chip networks, not only to a network on a single chip.

The proposed scheme is relevant for device level communication protocols (e.g., DTL, AXI, OCP). It allows transaction to be aborted in a controlled way. The proposed scheme is backward compatible with the schemes it extends.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. An integrated circuit comprising:
a plurality of processing modules including a first module and a second module;
an interconnect device for coupling said plurality of processing modules and for enabling a device-level communication based on transactions between said plurality of processing modules, wherein the first processing module issues at least one transaction for reception by the second processing module through the interconnect device;
at least one transaction abortion unit connected at least one of between the first module and the interconnect device and between the second module and the interconnect device for aborting at least one transaction issued from said first module in response to receiving an abort request issued by said first module, by initiating a discard of said at least one transaction to be aborted, and by issuing a response indicating a success/failure of the abort request; and
at least one network interface associated to one of said plurality of processing modules for controlling the communication between said one of said plurality of processing modules and said interconnect,
wherein said at least one transaction abortion unit is arranged in one of said network interfaces;
wherein said at least one network interface further comprise a request buffer for buffering received data; and
wherein said transaction abortion unit is adapted to issue a discard for said at least one transaction to be aborted as stored in said request buffer.

2. The integrated circuit according to claim 1, wherein said at least one transaction abortion unit is adapted to perform said at least one transaction abortion atomically or partially.

3. An integrated circuit comprising:
a plurality of processing modules including a first module and a second module;
an interconnect device for coupling said plurality of processing modules and for enabling a device-level communication based on transactions between said plurality of processing modules, wherein the first processing module issues at least one transaction for reception by the second processing module through the interconnect device;
at least one transaction abortion unit connected at least one of between the first module and the interconnect device and between the second module and the interconnect device for aborting at least one transaction issued from said first module in response to receiving an abort request issued by said first module, by initiating a discard of said at least one transaction to be aborted, and by issuing a response indicating a success/failure of the abort request; and
at least one network interface associated to one of said plurality of processing modules for controlling the communication between said one of said plurality of processing modules and said interconnect,
wherein said at least one transaction abortion unit is arranged in one of said network interfaces;

wherein said at least one network interface further comprise a response buffer or buffering outgoing data; and
wherein said transaction abortion unit is adapted to issue a discard for said at least one transaction to be aborted as stored in said response buffer.

4. An integrated circuit comprising:
a plurality of processing modules including a first module and a second module;
an interconnect device for coupling said plurality of processing modules and for enabling a device-level communication based on transactions between said plurality of processing modules, wherein the first processing module issues at least one transaction for reception by the second processing module through the interconnect device; and
at least one transaction abortion unit connected at least one of between the first module and the interconnect device and between the second module and the interconnect device for aborting at least one transaction issued from said first module in response to receiving an abort request issued by said first module, by initiating a discard of said at least one transaction to be aborted, and by issuing a response indicating a success/failure of the abort request;
wherein said request for said at least one transaction abortion specifies which transactions are to be aborted, and
wherein said response issued by said transaction abortion unit specifies which of the requested at least one transaction have been aborted.

5. A method for transaction abortion in an integrated circuit having a plurality of processing modules and an interconnect device for coupling said plurality of processing modules and for enabling a communication based on transactions between said plurality of processing modules, wherein a first processing module issues at least one transaction towards a second processing module, the method comprising the acts of:
buffering received data in a request buffer of a network interface configured to control the communication between said first processing module and said interconnect device;
aborting at least one transaction issued from said first module by receiving an abort request issued by said first module, by initiating a discard of said at least one transaction to be aborted, and by issuing a response indicating the success/failure of the requested transaction abortion; and
issuing a discard for said at least one transaction to be aborted as stored in said request buffer.

6. A data processing system, comprising:
a plurality of processing modules including a first module and a second module;
an interconnect device for coupling said plurality of processing modules and for enabling a device-level communication based on transactions between said plurality of processing modules, wherein the first processing module issues at least one transaction for reception by the second processing module through the interconnect device;
at least one transaction abortion unit connected at least one of between the first module and the interconnect device and between the second module and the interconnect device for aborting at least one transaction issued from said first module in response to receiving an abort request issued by said first module, by initiating a discard of said at least one transaction to be aborted, and by issuing a response indicating a success/failure of the abort request; and
at least one network interface associated to one of said plurality of processing modules for controlling the communication between said one of said plurality of processing modules and said interconnect,
wherein said at least one transaction abortion unit is arranged in one of said network interfaces;
wherein said at least one network interface further comprise a request buffer for buffering received data; and
wherein said transaction abortion unit is adapted to issue a discard for said at least one transaction to be aborted as stored in said request buffer.

7. A method for transaction abortion in an integrated circuit having a plurality of processing modules and an interconnect device for coupling said plurality of processing modules and for enabling a communication based on transactions between said plurality of processing modules, wherein a first processing module issues at least one transaction towards a second processing module, the method comprising the acts of:
buffering outgoing data in a response buffer of a network interface configured to control the communication between said first processing module and said interconnect device;
aborting at least one transaction issued from said first module by receiving an abort request issued by said first module, by initiating a discard of said at least one transaction to be aborted, and by issuing a response indicating the success/failure of the requested transaction abortion; and
issuing a discard for said at least one transaction to be aborted as stored in said response buffer.

8. A method for transaction abortion in an integrated circuit having a plurality of processing modules and an interconnect device for coupling said plurality of processing modules and for enabling a communication based on transactions between said plurality of processing modules, wherein a first processing module issues at least one transaction towards a second processing module, the method comprising the acts of:
issuing by said first module an abort request that specifies which transactions are to be aborted; and
aborting at least one transaction issued from said first module in response to receiving the abort request, by initiating a discard of said at least one transaction to be aborted, and by issuing a response indicating the success/failure of the requested transaction abortion;
wherein the response indicating the
success/failure indicates which of the transactions have been aborted.

* * * * *